United States Patent [19]

Hill et al.

[11] Patent Number: 4,779,945
[45] Date of Patent: Oct. 25, 1988

[54] DIRECTIONAL COUPLER UTILIZING BICONICALLY TAPERED OPTICAL FIBERS AND A METHOD OF MAKING SAME

[76] Inventors: Kenneth O. Hill, 1 Binning Court, Kanata, Ontario; Derwyn C. Johnson, 43 Stillwater Drive, Nepean, Ontario, both of Canada

[21] Appl. No.: 888,696

[22] Filed: Jul. 24, 1986

[30] Foreign Application Priority Data

Jul. 29, 1985 [CA] Canada ................... 487720

[51] Int. Cl.$^4$ ................... G02B 6/26
[52] U.S. Cl. ................... 350/96.15; 350/96.10; 350/320
[58] Field of Search ............... 350/96.10, 96.15, 96.16, 350/96.20, 320, 96.29, 96.30; 156/153, 154, 160, 161

[56] References Cited

U.S. PATENT DOCUMENTS

| | | | |
|---|---|---|---|
| 3,825,319 | 7/1974 | Cook et al. | 350/96.15 X |
| 3,931,518 | 1/1976 | Miller | 350/96.15 |
| 4,019,051 | 4/1977 | Miller | 350/96.15 |
| 4,054,366 | 10/1977 | Barnoski et al. | 350/96.15 X |
| 4,307,933 | 12/1981 | Palmer et al. | 350/96.15 X |
| 4,315,666 | 2/1982 | Hicks, Jr. | 350/96.15 |
| 4,330,170 | 5/1982 | Johnson et al. | 350/96.15 X |
| 4,336,047 | 6/1982 | Pavlopoulos et al. | 350/96.15 X |
| 4,392,712 | 7/1983 | Ozeki | 350/96.16 |
| 4,493,528 | 1/1985 | Shaw et al. | 350/96.15 |
| 4,632,513 | 12/1986 | Stowe et al. | 350/320 |
| 4,673,270 | 6/1987 | Gordon | 350/96.15 |
| 4,688,882 | 8/1987 | Failes | 350/96.15 |
| 4,707,201 | 11/1987 | Failes | 350/96.15 X |
| 4,714,316 | 12/1987 | Moore et al. | 350/96.15 X |

FOREIGN PATENT DOCUMENTS 1119860  3/1982  Canada ................... 350/96.15

OTHER PUBLICATIONS

Bergh et al., "Single-Mode Fibre Directional Coupler", Elect. Lett., 3/80, vol. 16, No. 7, pp. 260-261.

Primary Examiner—William L. Sikes
Assistant Examiner—Brian M. Healy
Attorney, Agent, or Firm—Pascal & Associates

[57] ABSTRACT

A fiber optic directional coupler comprising a pair of strands of single mode optical fiber having biconical tapers whereby the electromagnetic field within the fibers extend virtually to the cladding outside surface, the strands in the region of the tapers being bent in opposite directions and positioned with their cladding in contact over a length of the waist of the tapers, the cladding in contact being narrowed on one side, flat, and polished, whereby the field is coupled from one strand to the other.

8 Claims, 3 Drawing Sheets

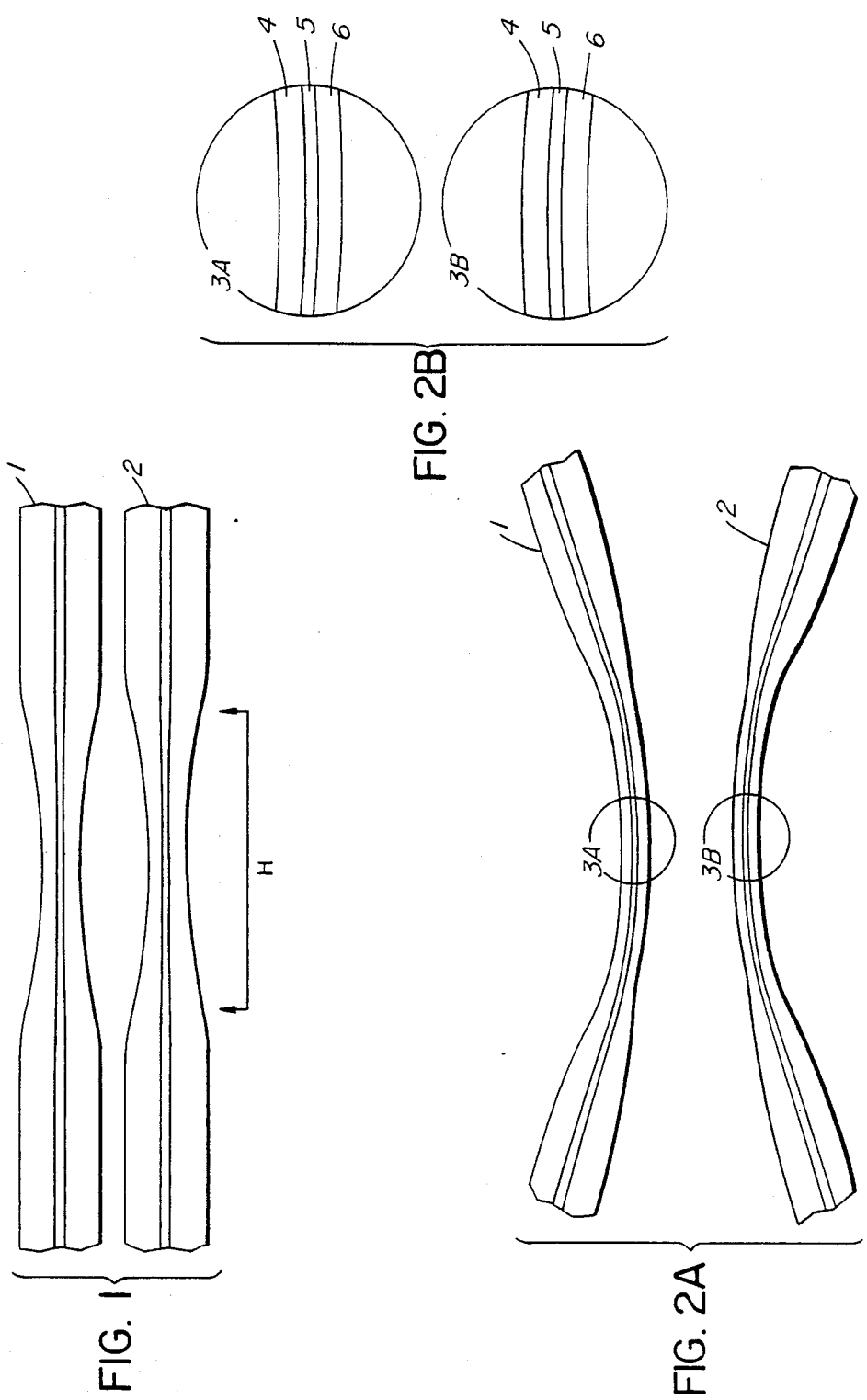

DIRECTIONAL COUPLER UTILIZING BICONICALLY TAPERED OPTICAL FIBERS AND A METHOD OF MAKING SAME

FIELD OF THE INVENTION

This invention relates to a fiber optic directional coupler and a method for forming the coupler.

BACKGROUND TO THE INVENTION

Fiber optic directional couplers are used to couple optical electromagnetic energy from one fiber optic strand to another. Each strand is typically formed of a core covered by cladding, the index of refraction of the core being greater than that of the cladding so that the energy is guided within the strand with minimum loss.

In single mode fibers the core and cladding indices of refraction and the core radius are selected so that the energy is contained primarily within the core. In contrast to multimode fibers, in which the core size is typically about 50 to 100 microns in diameter, in single mode fiber the core diameter is typically 5 to 10 microns in diameter.

Various kinds of couplers have been designed in the past to couple electromagnetic energy from one strand to another. Some couplers fuse the fibers together, for example, see Canadian Pat. No. 1,119,860 issued Mar. 16, 1982 entitled LOW LOSS ACCESS COUPLER FOR MULTIMODE OPTICAL FIBER DISTRIBUTION SYSTEMS by Kawasaki et al; U.S. Pat. No. 3,931,518 to Miller; U.S. Pat. No. 4,019,015 to Miller; U.S. Pat. No. 4,307,933 to Palmer and 4,336,047 which relate to single or multimode directional couplers.

In U.S. Pat. No. 4,493,528 to Shaw a single mode fiber optic coupler is described of a kind to which the present invention is directed. In that patent a pair of oppositely curved fibers are placed in contact, but prior to contact, adjacent portions of the cladding are ground off and are optically polished. The grinding and polishing are conducted with the fiber strands embedded in slots in glass blocks or substrates with the adjacent surfaces of the glass substrates being ground at the same time as the cladding of the fibers. Once grinding and polishing have been completed, the two substrates are placed together face to face whereby the fibers come into contact, resulting in energy from one fiber being transferred to the other once energy is being carried by an input fiber.

The glass substrate and fiber are ground and polished together until the fiber cores are in close proximity, i.e. within a few microns, of the glass substrate surface. In order to transfer the light energy between the two single mode fibers in the directional coupler, the separation of the fiber cores should of the order of a few fiber core diameters.

The polishing of the glass block is a difficult process. Not only must the flatness of the block be maintained but the depth of the fiber core below the block surface must be closely monitored. The final stage of polishing is a step-by-step process requiring the measurement of the core depth followed by the removal of only a few microns of material at a time.

Clearly the tolerance of polishing is very critical. If one overpolishes, too much coupling will be achieved and the energy will be coupled back into original fiber, if there is too little polishing, there will be no or little coupling achieved. There is a very narrow window of critical depth to which the fibers may be successfully ground and polished, which is typically a few microns or less.

The polishing process is further complicated in the case of directional couplers made from polarization maintaining fiber. Such single mode fibers often contain stress members, which are larger than the fiber core, and are located just outside but close to the fiber core. During the polishing process removal of part of the stress member can often result in fracture of the fiber core.

The process of polishing to a precise depth is very labor intensive and results in a low yield of useful couplers due to fiber fracture during polishing or polishing errors which results in the removal of too much material.

SUMMARY OF THE INVENTION

The present invention is a coupler of the type described which can be fabricated using greatly reduced tolerance of grinding and polishing. Grinding and polishing can be effected to a depth which is relatively distant from the stress members. The tolerance window is greatly expanded.

In the coupler described in the aforenoted U.S. Pat. No. 4,493,528 it has been determined that the diameter of the field within the fiber is approximately the fiber-core diameter, which is typically 8 microns. In contrast, the present invention expands the field substantially to a diameter such that the field can extend adjacent to the cladding-air or external surface interface, e.g. typically 50 microns diameter. In the case of polarization preserving fiber the field is expanded through the stress members and into the cladding. In the present invention one side of the cladding is ground and polished to obtain access to the field. Clearly due to the larger field size the difficulty of fabrication to within the tolerance window is substantially reduced. The result is a substantially increased yield of useful directional couplers, and substantially reduced cost.

The field is expanded within the coupling region by using optical fibers having biconical tapers at the coupling region. The fibers are tapered such that the normalized frequency of the local $HE_{11}$ mode at the taper waist is approximately or slightly greater than unity. This causes the field to leave the core and extend into the cladding virtually to the cladding outside surface. At the other side of the taper the field decreases in diameter until it is contained within the core. The cladding is removed on one side of the fiber at the waist region where the field extends virtually to the cladding outside surface, the remaining cladding of the two strands then being placed in contact. This ensures efficient coupling with substantially reduced required tolerance of the required thickness of cladding material to be removed.

In general, the invention is a fiber optical directional coupler comprising a pair of strands of single mode optical fiber having biconical tapers, whereby the electromagnetic field within the fiber extends virtually to the cladding outside surface. The strands in the region of the taper are bent in opposite directions and are positioned with their cladding in contact over the length of the waist of the tapers. The cladding in the contact regions is narrowed on one side, is flat, and polished, whereby the field is coupled from one strand to the other.

The invention is also a fiber optic directional coupler comprised of a pair of strands of single mode optical fiber having biconical tapers tapered such that the normalized frequency of the local $HE_{11}$ mode at the taper waist is approximately unity. The fibers are bent into opposing U-shapes in their tapered regions. The cladding of each fiber in the waist region of each tapered region is polished on the side adjacent the other fiber optically flat and smooth, the flat regions of both fibers being placed in contact with each other. A substantially transparent liquid such as oil of suitable retractive index can be injected between the cladding to reduce reflection losses.

Preferably each fiber is embedded into a glass substrate, wherein the flat portion of the cladding is precisely coplanar with a surface of the corresponding substrate, the surfaces of the substrates being optically flat and smooth and in contact with each other.

Another embodiment of the invention is a method for fabricating a fiber optic directional coupler comprising preparing a pair of substrates with flat surfaces, and forming a channel in each substrate having a depth which is greater toward the edges than toward a central region. A biconically tapered optical fiber is inserted in each channel whereby the waist region of each fiber is located over the shallowest portion of the channel. The fibers are then adhered within the channel, preferably with an adhesive which has a hardness similar to that of the glass and of the fiber. The surface of each substrate and the waist region of the fibers are ground, whereby the cladding of each fiber is ground optically smooth and coplanar with the substrate surface to a depth adjacent but not into the core of the fiber. The surfaces of the substrates are then placed together in contact whereby the ground portions of the cladding are in contact to form the coupler.

BRIEF DESCRIPTION OF THE DRAWINGS

A better understanding of the invention will be obtained with reference to the detailed description below in conjunction with the following drawings, in which FIG. 1 illustrates portions of two single mode biconically tapered glass fibers, FIG. 2 illustrates the two fibers bent in the waist regions of the tapers, with enlargements thereof.

DETAILED DESCRIPTION OF THE INVENTION

Figure 3:
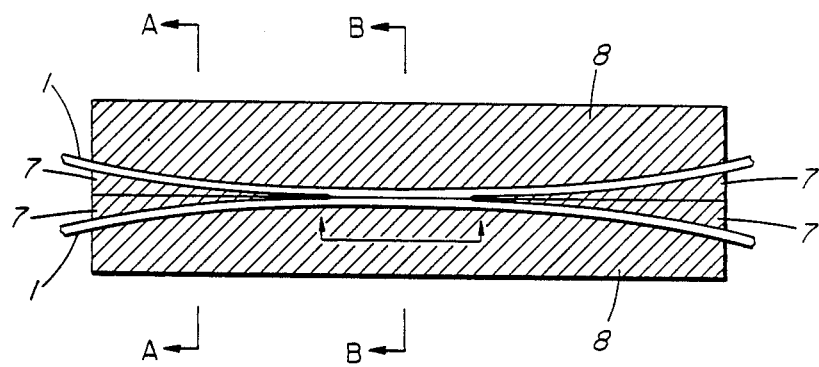
FIG. 3 illustrates a cross section of the finished coupler in accordance with the present invention.

FIG. 1 illustrates sections of a pair of biconical tapered single mode fibers 1 and 2. The fibers are tapered over a region X by heating over the region X and pulling. The decreasing taper portion of the fiber causes a light signal input at one end to penetrate substantially into its cladding. Sufficient tapering in the fiber core diameter must be achieved such that the optical signal expands into the cladding remaining substantially bound to the core with minimal loss of light to radiation; the light local mode field should approach but preferably not extend significantly beyond the cladding-air interface. In the increasing taper portion the $HE_{11}$ local optical field is contracted so that the energy is carried primarily in the core of the output portion of the monomode fiber.

For the above to be achieved, the normalized frequency V for the local $HE_{11}$ core-guided lights must be approximately unity at the taper waist i.e. $V \approx 1$ where $$V = \frac{2\pi a}{\lambda} \sqrt{n_{core}^2 - n_{cladding}^2},$$

where
V is the normalized cut-off frequency of the local $HE_{11}$ mode (and is dimensionless),
a is the (local) radius of the core,
λ is the wavelength of an optical signal passing through the coupler, and
$n_{core}$ and $n_{cladding}$ are the indices of refraction of the core and cladding respectively.

In order to reduce losses of light to radiation by the tapers, the rate of change in diameter of the fiber-core along the taper must be sufficiently gradual so that the spot size of the local mode changes adiabatically i.e. light in the local $HE_{11}$ mode does not couple to the radiation modes. The condition for this to occur has been described by Synder (Section 19.2 p. 409–411, Optical Waveguide Theory) and requires that changes in fiber diameter occur in distances large compared to the beat length for coupling from the $HE_{11}$ local mode to the radiation modes.

Considering now FIGS. 2, 3, 4 and 5, the two fibers are bent into wide U-shapes with the open portions of the Us facing away from each other, in the waist regions of the tapered portions of the fibers. The external faces of the Us face each other. The radii of the Us are preferably such that the adjacent portions of the tapered regions will be rendered flat with polishing. As is better illustrated in the magnified parts 3A and 3B of the tapered regions, the cladding 4 tapers toward the core 5 in the waist region (the core of each fiber is also narrowed in the same proportion).

The portion of the cladding at the outside of the U-curves of each fiber is ground flat as shown at 6, thus narrowing the cladding thereat.

The above steps are best carried out with the fibers embedded in channels or slots 7 of corresponding blocks or substrates 8, which are preferably formed of glass having similar hardness as the fibers. The depth of the channels should increase at the positions adjacent the sides of the substrates and should decrease in the central portions. With the fibers laid in the blocks the U-shapes are thus defined. The fibers should be adhered within the channels preferably using an epoxy or the like adhesive 9 having similar hardness as the fibers.

The depth of the channels can be such that the portion of the fibers adjacent the shallowest part of the channels lies just under the top surface of the corresponding substrate, or can be such that the cladding portion of the fibers extends above the top surface of the substrate. In the latter case preferably the shallowest portion of each channel is at least one-half of the thickness of the fiber plus one-half the thickness of the core depth.

The externally facing cladding of each fiber is then ground and polished optically flat and smooth. In the case in which the side of the channel is at the surface of or above the fiber, the top surface of the substrate is ground with the cladding. In the case in which the cladding extends above the surface of the substrate, the cladding alone will be ground and polished to the level of the top surface of the substrate.

If different hardnesses of substrates and adhesive are used relative to the hardness of the glass fibers, it is important to ensure that the grinding and polishing occurs evenly in order to obtain optically flat and smooth surfaces. Equal hardnesses help to ensure that this will occur.

Once the grinding and polishing has been completed, the polished portions of the fibers are placed together. Preferably the flat regions of the fibers are placed in optical contact, but in some cases it may be necessary to separate them by a thin film of oil or other transparent substance having an index of refraction which matches that of the fiber cladding.

Figures 4, 5:
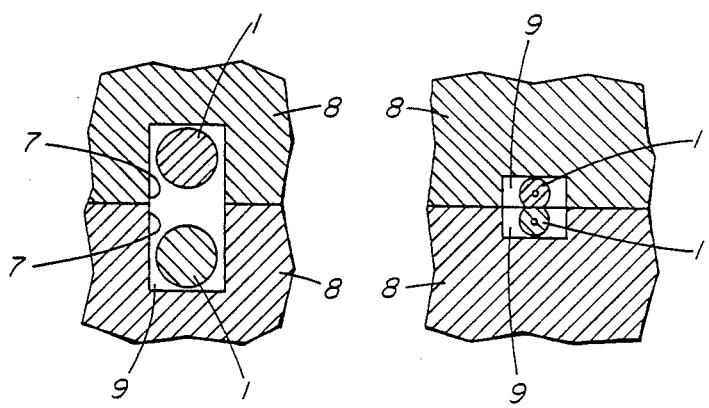
FIG. 4 is a cross section of the finished coupler at section A—A.
FIG. 5 is a cross section of the finished coupler at section B—B.

FIG. 4 illustrates axially sectional views of the fibers are shown of section A—A in FIG. 3, being contained within the channels 7 of the substrates 8. FIG. 5 illustrates axial sectional views of the fibers; it may be seen that the fibers are considerably narrowed in the biconical tapered regions and do not extend to both side walls of the channel. The cladding has been ground down and polished, but to a depth relatively uncritical relative to the depth required in the aforenoted U.S. Pat. No. 4,493,528.

Figure 6A:
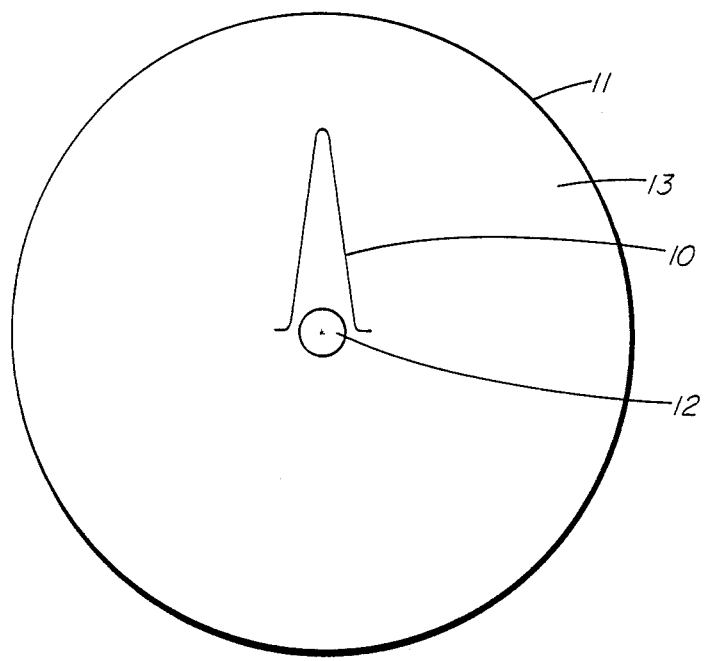
FIG. 6A is an energy diagram of a single mode optical fiber.

FIG. 6A illustrates an energy graph 10 of intensity Vs diameter in a fiber 11 which has core 12 and cladding 13. It may be seen that the energy is carried almost entirely within the core; in order to tap the field one must approach the core very closely and precisely.

Figure 6B:
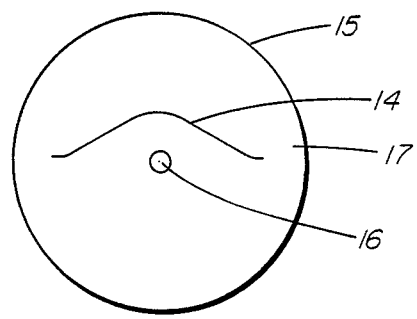
FIG. 6B is an energy diagram of a single mode optical fiber in the waist region of a biconical taper.

FIG. 6B illustrates an energy graph similar to FIG. 6A, but here an energy field 14 is illustrated which is carried within the waist region of a biconically tapered fiber 15, having core 16 and cladding 17. It may be seen that the energy field is considerably spread within the cladding, which can be tapped within the cladding relatively remotely and relatively uncritically in position away from the core. The mode field in the waist region extends to within a few microns of the cladding surface. By control of the dimensions of the biconical taper it is possible to expand the spot size of the $HE_{11}$ of an 8/125 micron monomode fiber to a mode size of 50 microns. This larger spot size for the $HE_{11}$ mode alleviates considerably the difficulty of the polishing task, and may make it possible to carry out the polishing using machines. The field in the case of polarization preserving fiber appears also to extend beyond the stress members, thereby eliminating the need to move the stress members in order to achieve coupling.

It should be noted that the biconical tapers used in this invention can include structures having an elongated constant diameter waist region.

A considerably increased yield of couplers, made with reduced difficulty, and reduced cost fiber optic coupler results from the present invention. Other embodiments or variations thereof may now become apparent using the principles described herein. All are considered to be within the sphere and scope of the invention as defined in the claims appended hereto.

We claim:

1. A fiber optic directional coupler comprising a pair of strands of single mode optical fiber having biconical tapers whereby the electromagnetic field within the fiber extends virtually to the cladding outside surface, the strands in the region of the tapers being bent in opposite directions and positioned with their cladding in contact over a length of the waist of the tapers, the cladding in contact being narrowed on one side, flat, and polished, whereby said field is coupled from one strand to the other.

2. A fiber optic directional coupler comprising a pair of strands of single mode optical fiber having biconical tapers tapered such that in the vicinity of the taper waist the normalized frequency of the coupler is approximately unity, the fibers being bent into opposing U-shapes in their tapered regions, the cladding of each fiber in the waist region of each tapered region being narrowed on the side adjacent the other fiber, optically flat and smooth, the flat region of both fibers being in optical contact with each other or separated by a thin film of refractive index matching oil or other substantially transparent optical substance.

3. A fiber optic directional coupler as defined in claim 1 in which each fiber is embedded into a glass substrate, the flat portion of the cladding being precisely coplanar with a surface of the corresponding substrate, the surfaces of the substrates being optically flat and smooth and in optical contact with each other or separated by a thin film of index of refraction matching oil or other substantially transparent optical substance.

4. A method of fabricating a fiber optic directional coupler comprising:
  (a) preparing a pair of substrates with flat surfaces,
  (b) forming a channel in each substrate having a depth which is greater toward the edges of the substrate than toward a central region,
  (c) inserting a biconically tapered optical fiber in each channel whereby the waist region of the fiber taper region is located over the shallowest portion of the channel and the external surface of the fiber is either flat or convex, and adhering the fiber within the channel,
  (d) grinding the surface of each substrate and the waist region of the fiber whereby the cladding of each fiber is ground optically smooth and coplanar with the substrate surfaces to a depth adjacent but not into the core of the fiber, and
  (e) locating the surfaces of the substrates together whereby the ground portions of the cladding are in contact.

5. A method as defined in claim 4 in which the shallowest portion of each channel is at least one-half the thickness of the fiber plus one-half the thickness of the core in depth.

6. A method as defined in claim 4 in which the substrates are glass blocks having hardness similar to the hardness of the fibers.

7. A fiber optic directional coupler as defined in claim 2 in which each fiber is embedded into a glass substrate, the flat portion of the cladding being precisely coplanar with a surface of the corresponding substrate, the surfaces of the substrates being optically flat and smooth and in optical contact with each other or separated by a thin film of index of refraction matching oil or other substantially transparent optical substance.

8. A method as defined in claim 5 in which the substrates are glass blocks having hardness similar to the hardness of the fibers.

* * * * *